United States Patent
Taylor et al.

(10) Patent No.: US 8,807,635 B2
(45) Date of Patent: Aug. 19, 2014

(54) SELF-CLEANING CAB FLOOR

(75) Inventors: Lance A. Taylor, Wichita, KS (US); Brady Lewis, Peck, KS (US); Jason Bergkamp, Mount Hope, KS (US)

(73) Assignee: CNH Industrial America LLC, New Holland, PA (US)

( * ) Notice: Subject to any disclaimer, the term of this patent is extended or adjusted under 35 U.S.C. 154(b) by 81 days.

(21) Appl. No.: 13/221,462

(22) Filed: Aug. 30, 2011

(65) Prior Publication Data

US 2012/0205945 A1   Aug. 16, 2012

Related U.S. Application Data

(60) Provisional application No. 61/463,062, filed on Feb. 11, 2011.

(51) Int. Cl.
*B62D 25/20* (2006.01)

(52) U.S. Cl.
USPC .................. 296/193.07; 296/190.08

(58) Field of Classification Search
USPC ............. 296/187.08, 190.08, 190.01, 193.07, 296/208, 39.1, 97.23
See application file for complete search history.

(56) References Cited

U.S. PATENT DOCUMENTS

| | | | |
|---|---|---|---|
| 1,509,237 A | 9/1924 | Harris | |
| 2,144,982 A | 1/1939 | Jones | |
| 2,997,333 A | 8/1961 | Kauffman et al. | |
| 4,765,670 A * | 8/1988 | Jackson | 296/97.23 |
| 5,054,842 A | 10/1991 | Ishiwatari et al. | |
| 6,257,645 B1 * | 7/2001 | Kraimer et al. | 296/97.23 |
| 6,866,332 B2 | 3/2005 | Takeuchi et al. | |
| 7,004,533 B2 * | 2/2006 | Arthur et al. | 296/190.08 |
| 7,625,037 B2 | 12/2009 | Gollehur et al. | |
| 2009/0230729 A1 | 9/2009 | Lusk | |

FOREIGN PATENT DOCUMENTS

| | | | |
|---|---|---|---|
| JP | 60033170 A | | 2/1985 |
| JP | 03153480 A | * | 7/1991 |
| JP | 405009955 A | | 1/1993 |

* cited by examiner

*Primary Examiner* — Jason S Morrow
*Assistant Examiner* — E Turner Hicks
(74) *Attorney, Agent, or Firm* — Sue C. Watson

(57) ABSTRACT

A self-cleaning floor for use with a work vehicle includes a layer of material providing the floor for a cab of the work vehicle. The layer includes features formed in a region to frictionally secure operator footing during operator egress/ingress and operation of the work vehicle. A recess is formed along one end of the layer, the recess substantially aligned with a primary direction of movement of the work vehicle. An opening is formed in the work vehicle in substantial alignment with the recess to facilitate removal of debris from the cab floor and exterior of the work vehicle via the recess and the opening during operation of the work vehicle. Change in speed and/or direction of the work vehicle urges debris on the cab floor toward the recess.

20 Claims, 8 Drawing Sheets

SELF-CLEANING CAB FLOOR

RELATED APPLICATION

This application claims priority to U.S. Provisional Patent Application Ser. No. 61/463,062, filed Feb. 11, 2011, entitled "Self Cleaning Cab Floor."

FIELD OF THE INVENTION

The present invention generally relates to off-highway equipment and, more particularly, to a cab region of an off-highway vehicle such as a skid steer or wheel loader.

BACKGROUND OF THE INVENTION

Work vehicles, such as a skid steer compact track loader or wheel loader is commonly used to load and move substantial volumes of dirt and like material from one location to another. A conventional loader includes a relatively large frame that is supported for self-propelled movement over land by pairs of air-filled pneumatic tires and has a bucket or implement mounted to one end thereof. The bucket or implement can be selectively elevated to a position above side panels on a wheel loader and can be selectively tilted to "dump" materials therefrom.

Due to the working environment and the proximity of work attachments to the operator cab, as well as from ingress/egress of the operator, debris can enter the cab, i.e., dirt, pebbles and the like, and accumulate in the cab floor. Vehicles lacking a door are especially susceptible to the accumulation of such materials. A sufficient accumulation of such materials can interfere with operation/control of the vehicle, such as floor pedal controls, in which the accumulated materials can prevent full movement of the controls, usually rotational movement, of the pedals. Removal of these materials is typically a labor intensive process.

In conventional work vehicles having foot control pedals, large openings may be formed under the foot pedals for debris to drop into a portion of the chassis positioned beneath the operator cab. Eventually, the debris must be removed from the chassis, which is also a labor-intensive process. Moreover, work vehicles having such large openings formed in the cab floor exposes the operator to noise and dust contamination.

Thus, there is a need and a desire for a cab floor that minimizes the accumulation of debris, if not substantially eliminating the need to clean the cab floor of such debris.

SUMMARY OF THE INVENTION

Other features and advantages of the present invention will be apparent from the following more detailed description of the preferred embodiment, taken in conjunction with the accompanying drawings which illustrate, by way of example, the principles of the invention.

The present invention relates to a self-cleaning floor for use with a work vehicle including a layer of material providing the floor for a cab of the work vehicle. The layer includes features formed in a region to frictionally secure operator footing during operator egress/ingress and operation of the work vehicle. A recess is formed along one end of the layer, the recess substantially aligned with a primary direction of movement of the work vehicle. An opening is formed in the work vehicle in substantial alignment with the recess to facilitate removal of debris from the cab floor and exterior of the work vehicle via the recess and the opening during operation of the work vehicle. Change in speed and/or direction of the work vehicle urges debris on the cab floor toward the recess.

The present invention further relates to a work vehicle including a motor secured to a frame for activating a driving device for selectably moving the frame, and an operator cab supported by the frame. A self-cleaning floor for use with the work vehicle includes a layer of material providing the floor for the cab of the work vehicle. The layer includes features formed in a region to frictionally secure operator footing during operator egress/ingress and operation of the work vehicle. A recess is formed along one end of the layer, the recess substantially aligned with a primary direction of movement of the work vehicle. An opening is formed in the work vehicle in substantial alignment with the recess to facilitate removal of debris from the cab floor and exterior of the work vehicle via the recess and the opening during operation of the work vehicle. Change in speed and/or direction of the work vehicle urges debris on the cab floor toward the recess.

The invention yet further relates to a work vehicle including a motor secured to a frame for activating a driving device for selectably moving the frame, and an operator cab supported by the frame. A self-cleaning floor for use with a work vehicle includes a layer of molded material providing the floor for a cab of a work vehicle. The layer includes features formed in a region to frictionally secure operator footing during operator egress/ingress and operation of the work vehicle. A recess is formed along one end of the layer, the recess substantially aligned with a primary direction of movement of the work vehicle. An opening is formed in the work vehicle in substantial alignment with the recess to facilitate removal of debris from the cab floor and exterior of the work vehicle via the recess and the opening during operation of the work vehicle. Change in speed and/or direction of the work vehicle urges debris on the cab floor toward the recess.

Numerous other features and advantages of the present invention will become readily apparent from the following detailed description, the accompanying drawings, and the appended claims.

Figure 1:
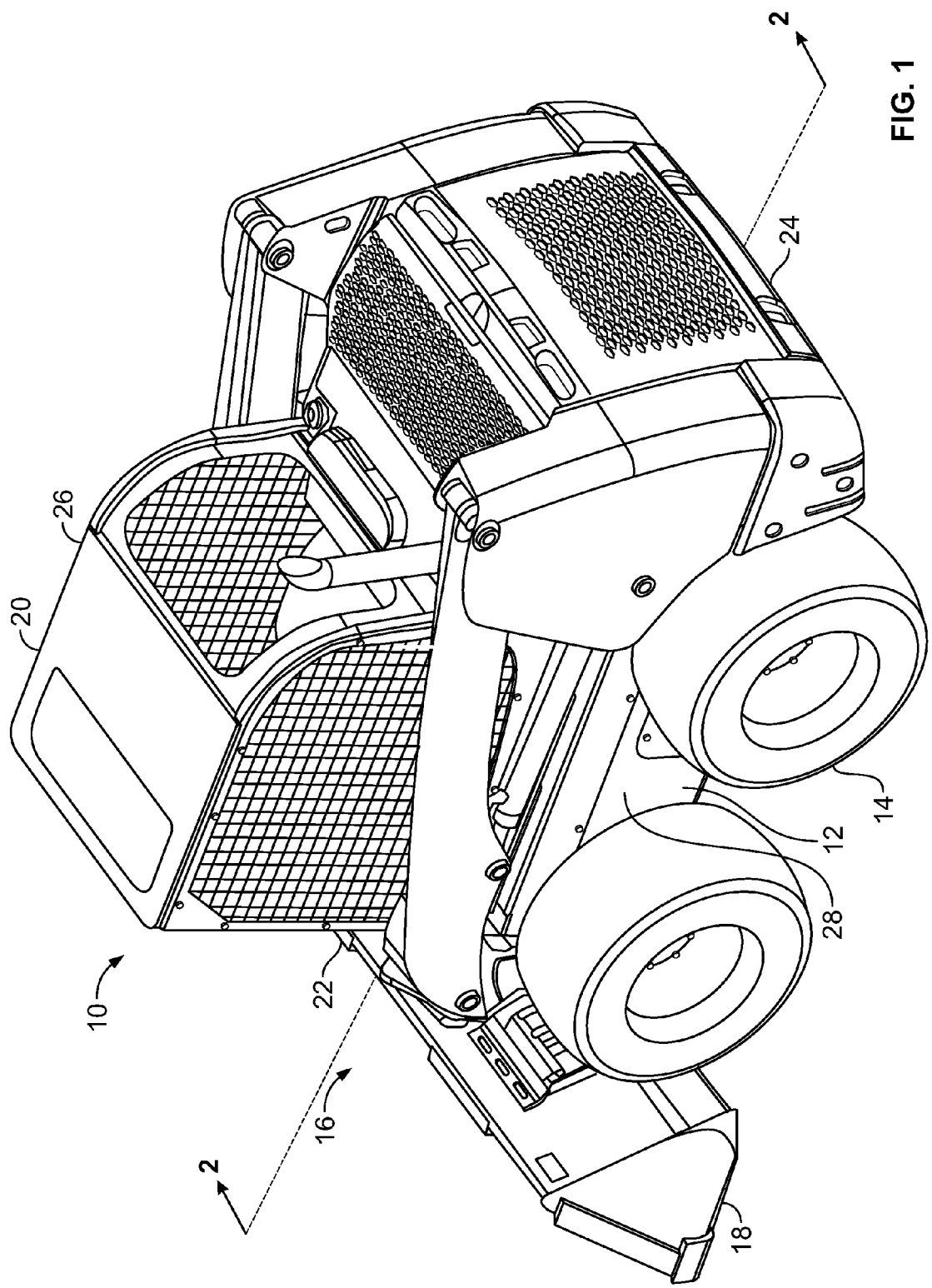
FIG. 1 is a an upper perspective view of a work vehicle embodying the teachings of the present invention.

Numerous other features and advantages of the present invention will become readily apparent from the following detailed description, the accompanying drawings, and the appended claims.

DETAILED DESCRIPTION OF THE INVENTION

While the present invention is susceptible of embodiment in various forms, there is shown in the drawings and will hereinafter be described a preferred embodiment of the present invention with the understanding that the present disclosure is to be considered as an exemplification of the invention that is not intended to limit the invention to the specific embodiment illustrated.

FIG. 1 shows a work vehicle 10, such as a skid steer or wheel loader provided with a frame 12 that rotatably carries a driving device 14, such as a plurality of wheels, although in another embodiment, tracks may be used or activated to selectably move the vehicle. A lifting structure 16 includes an arrangement of structural members and actuators controllable by an operator (not shown) to manipulate an implement 18 to perform work. Frame 12 structurally supports an operator cab 20 or cab to surround and protect the operator, which frame 12 includes a front end 22 facing implement 18 and an opposed back end 24 with ends 22, 24 positioned between opposed lateral sides 26, 28 of the frame.

Figure 2:
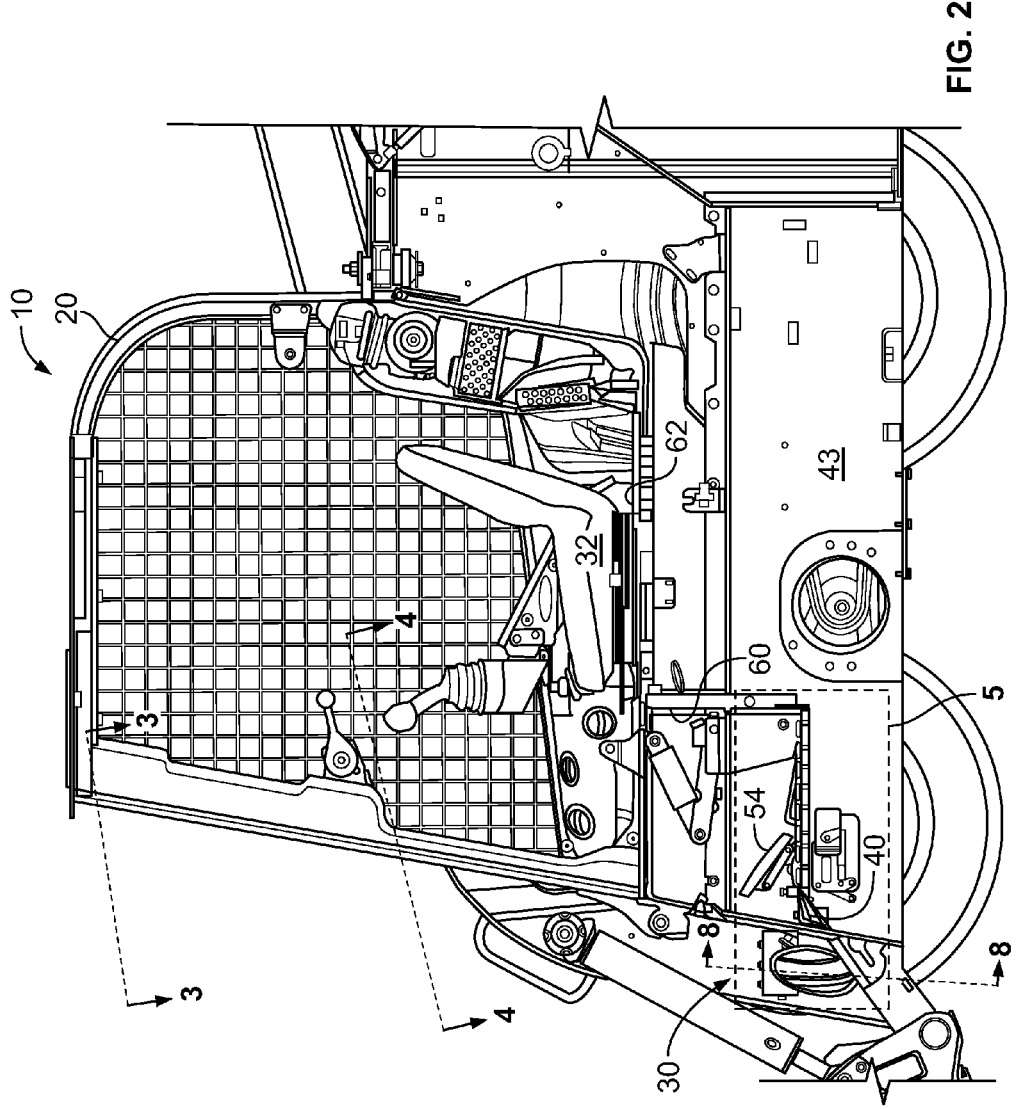
FIG. 2 is a cross section taken along line 2-2 from FIG. 1 of the present invention.

FIG. 2 shows a cross section taken along line 2-2 from FIG. 1 of the work vehicle 10 that is focused on features contained within cab 20. For example, cab 20 includes a floor 30, further including a self-cleaning floor that includes no moving parts, which floor will be discussed in more detail below. In one embodiment, floor 30 extends to a transition region 60 positioned between floor 30 and a cab structure 62 that supports an operator seat 32. In one embodiment, floor 30, transition region 60 and cab structure 62 are separate components, although in another embodiment, a single layer of material overlies floor 30, transition region 60 and cab structure 62, such as to permit cleaning, such as by washing. With the single material layer arrangement having a unitary or single piece construction, the layer may form a substantially fluid tight seal with corresponding cab structure, including structure 56,=(FIG. 5), such as to minimize or prevent moisture/contaminants from reaching a portion of chassis 43 located beneath cab 20.

FIGS. 2, 3, 5, 8 show one exemplary embodiment of the present invention, including a single foot-operated pedal 54 extending from floor 30. In this embodiment, floor layer 34 includes features 36, such as a plurality of protrusions positioned in close proximity with each other, but including spacings 84, 86 between the protrusions, such as to permit debris, such as rocks, dirt or other matter introduced inside cab 20 such as from the bottom of the operator's shoes, or such debris otherwise entering the cab through the operator ingress/egress area of the cab. A lower portion of the ingress/egress area may be shown as an opening 48 formed in a breastplate or plate 46 located along the forward, lower portion of the cab. Floor layer features 36 which comprise region 38 and foot rest region 39 may include traction enhancing features (i.e., to frictionally secure operator footing), such as with a gritty or "roughened" material or material layer secured to features 36 to enhance safety associated with operator ingress/egress and operation of the vehicle. As shown in the figures, features 36 associated with region 38 are raised or extend vertically higher than other surrounding portions of floor 30 to permit more convenient operator access (i.e., a more convenient region for the operator to step and/or for a seated operator to place his/her feet upon during operation).

As further shown in FIGS. 2, 3, 5, 8, floor layer 34 includes a forward end 50 (FIG. 3) near and facing an interior surface 49 of breastplate or plate 46 (located along a forward portion of cab 20) which end 50 extending to a rearward end 51 (FIG. 4) located near transition region 60. As shown, forward end 50 includes a recess 40 that is substantially centered along the forward end. In another embodiment, recess 40 may be located at any position along forward end 50. Forward end 50 is configured and disposed to extend in a direction that is substantially transverse to a direction of travel of the vehicle, which in most instances, is a forward direction of travel. However, in another vehicle construction or application in which the primary direction of travel of the vehicle is in a direction other than forward, end 50 could be positioned substantially transverse to the primary direction of travel of that particular vehicle. In other embodiments, the floor later may include multiple recesses positioned along one or more ends.

Figure 4:
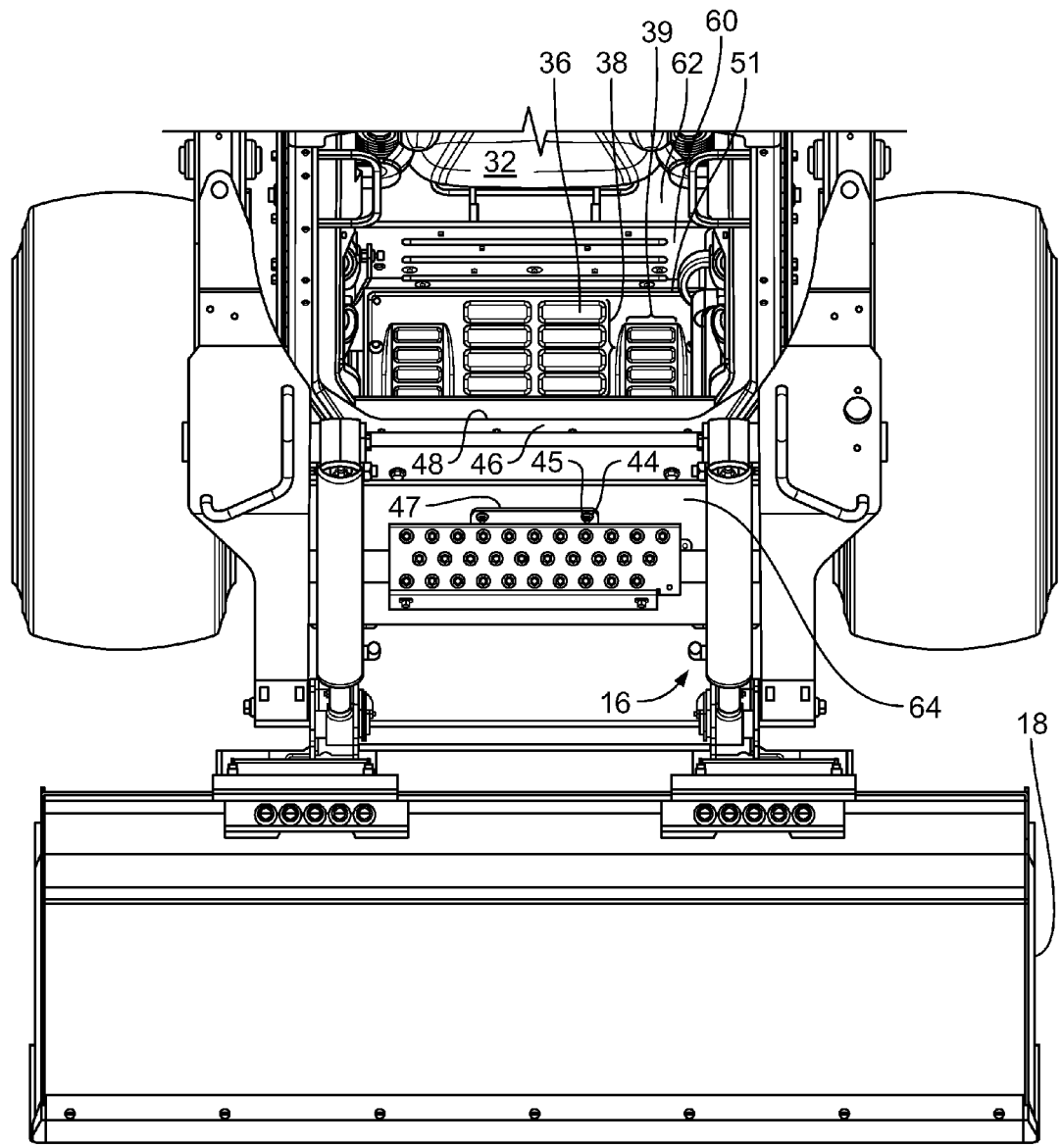
FIG. 4 is a cross section of an alternate embodiment of a work vehicle taken along lines 4-4 from FIG. 2 of the present invention.
Figure 5:
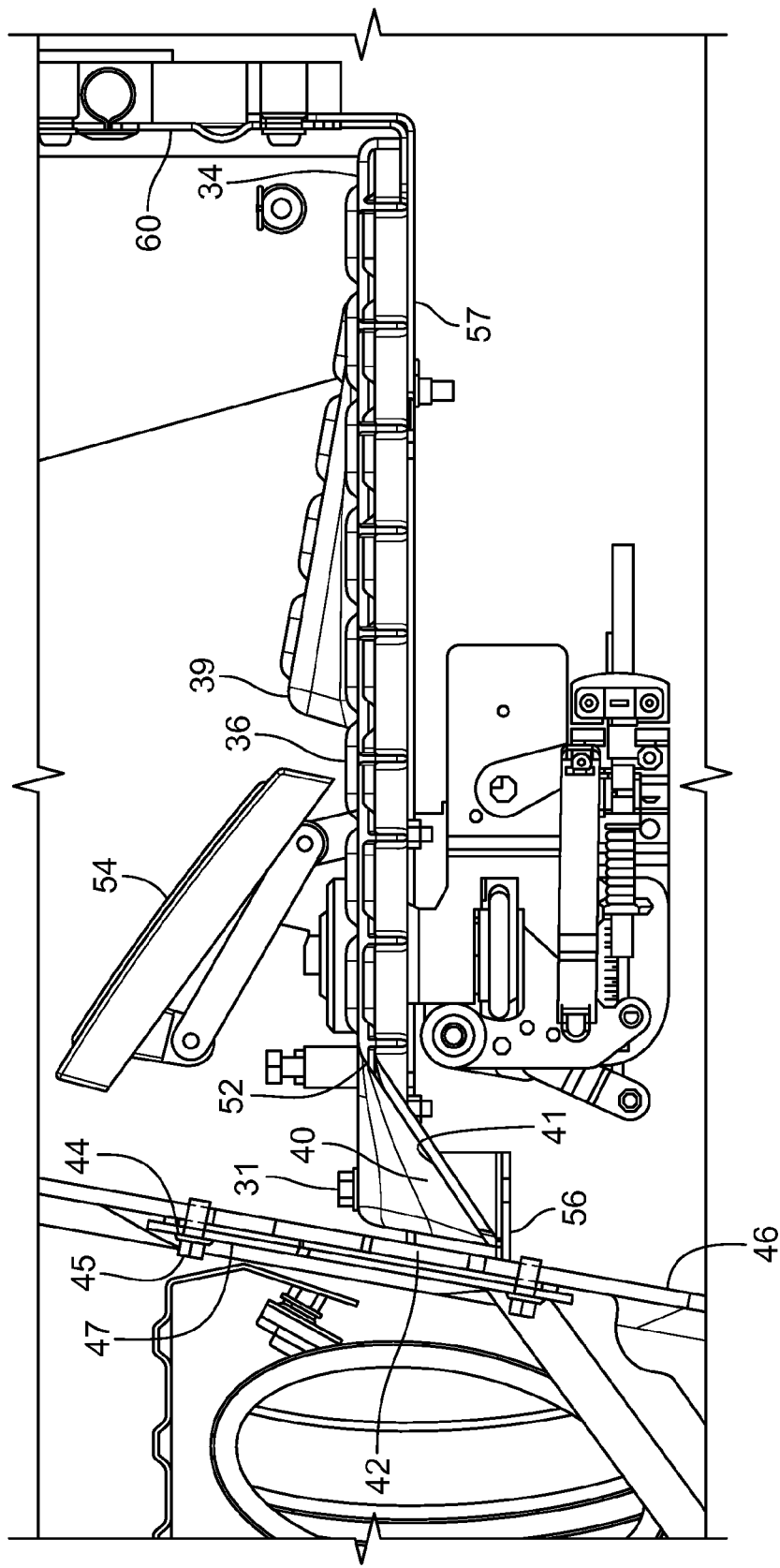
FIG. 5 is a partial, enlarged view taken from region 5 of FIG. 2 of the present invention.

As yet further shown in FIGS. 2, 3, 5, 8, 9 recess 40 of floor layer 34 includes a substantially surrounding transition surface 52, such as a curved or rounded surface, although in another embodiment, the transition surface may form a chamfered corner or define a different profile with respect to the surrounding portion of floor 30. Recess 40 is located in a position that is vertically lower than the rest of floor 30. As shown in FIG. 5, transition surface 52 of recess 40 includes a downwardly extending region 41, such as defined by a ramp that is further configured to collect debris loosely accumulating on the surface of floor 30. As further shown in the figures, base structure 56 (see FIGS. 5, 8 and 9) is especially well configured to support recess 40 formed in floor 30, with fasteners 31, in addition to base structure 57, to help provide a fluid tight seal between the base structure and floor 30. An opening 42, such as a substantially rectangular shaped opening sized for access by an adult human fist, is formed in plate 46 in substantial alignment with recess 40 to permit debris collected in recess 40 to be removed from the cab floor 30 and exterior of the work vehicle. In another embodiment, the opening may define a different shape than a rectangle, and in yet a further embodiment, may be sized differently than a human fist. Optionally, one or more apertures 44 (two shown in FIG. 4) are formed in a pattern with respect to opening 42 to correspond to a cover 47 (FIG. 4) including mating features formed in the cover 47 configured to receive fasteners 45 for installation of cover 47 over opening 42 of an exterior surface 64 of plate 46. For example, cover 47 may be utilized when vehicle 10 includes a door that substantially prevents the introduction of debris into the cab during operation of the vehicle, and further acts to reduce the amount of noise to which the operator is subjected.

In operation, by virtue of recess 40 that is formed along forward end 50 of layer 34 of cab floor 30 which is aligned with opening 42, which forward end 50 being substantially transverse to a primary direction of travel of vehicle, in which normal operation of the vehicle occurs along the primary direction of travel, especially when the vehicle, such as a skid loader, is subjected to virtually constant and sudden changes of direction and or changes of speed, loose debris lying on the cab floor surface is urged along the floor surface, such as from features 36 and along spacings 84, 86 formed in floor 30 toward and into recess 40. Debris collected in recess 40 moves, by virtue of gravity, along downwardly extending region 41 of recess 40 and through opening 42 of plate 46, thereby removing the debris from the cab floor 30 and exterior of the work vehicle. Removal of cab floor debris exterior of the work vehicle as in the present disclosure differs from conventional work vehicle arrangements that include an opening in the floor which permits debris to drop through the floor and into a lower compartment, which may contain hydraulic motors or other components. In those conventional work vehicle arrangements, debris must be removed from the lower compartment. Returning to the present disclosure, such cab floor debris removal exterior of the work vehicle is achieved without moving parts associated with the cab floor 30, merely utilizing normal operational movement of the vehicle. In an alternate embodiment, opening 42 may include a movable or "trap" door (not shown), such as a spring-loaded or magnetically secured door positioned between the recess and the opening. In response to a sufficient amount of debris collecting in the recess, the door may be temporarily urged to move, to permit the debris to be removed exterior of the work vehicle, with the door returning to a closed position upon removal of the debris.

Figure 3:
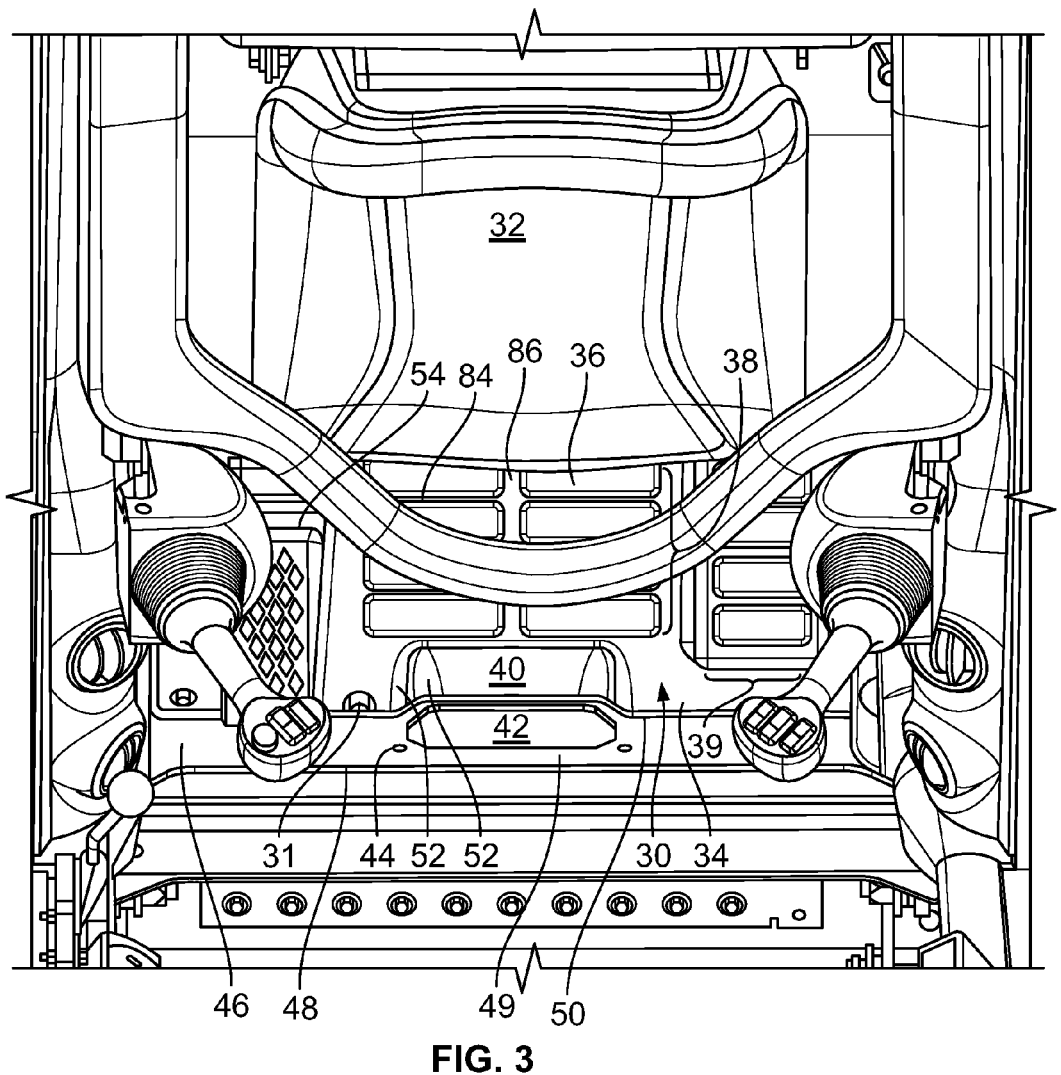
FIG. 3 is a cross section taken along line 3-3 from FIG. 2 of the present invention.
Figure 6:
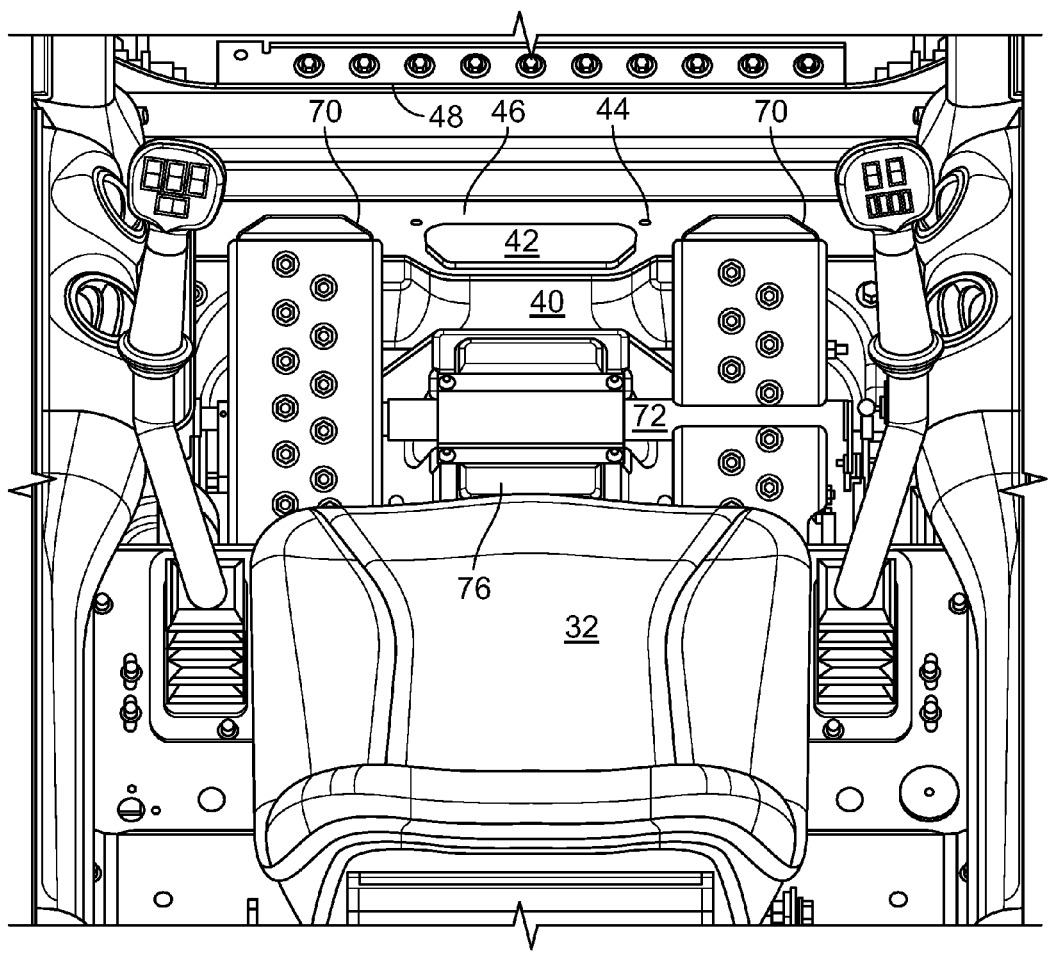
FIG. 6 is an enlarged, partial substantially plan view (similar to line 3-3 from FIG. 2) of an alternate embodiment of a work vehicle embodying the teachings of the present invention.
Figure 7:
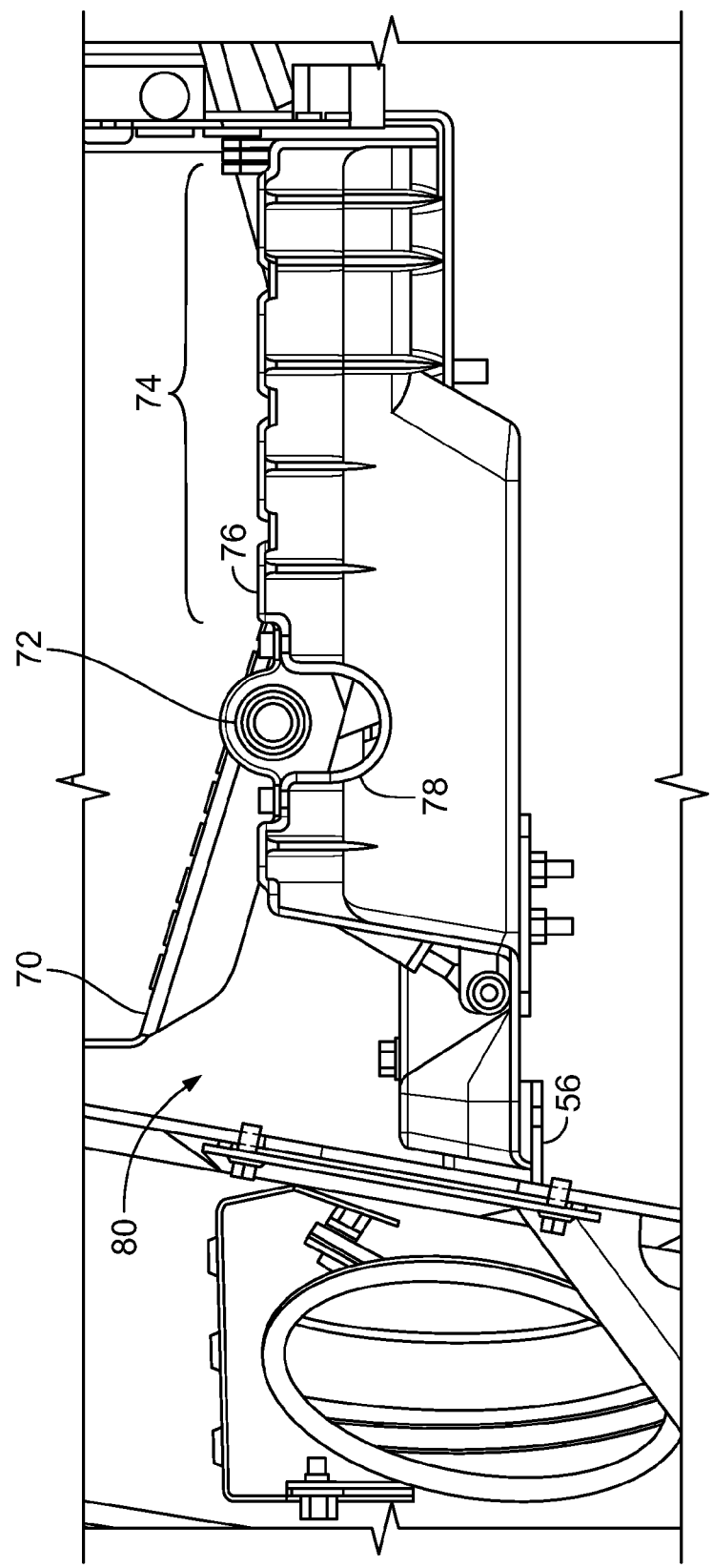
FIG. 7 is a partial, enlarged view of the alternate embodiment of FIG. 6, similar to FIG. 5, of the present invention.
Figure 8:
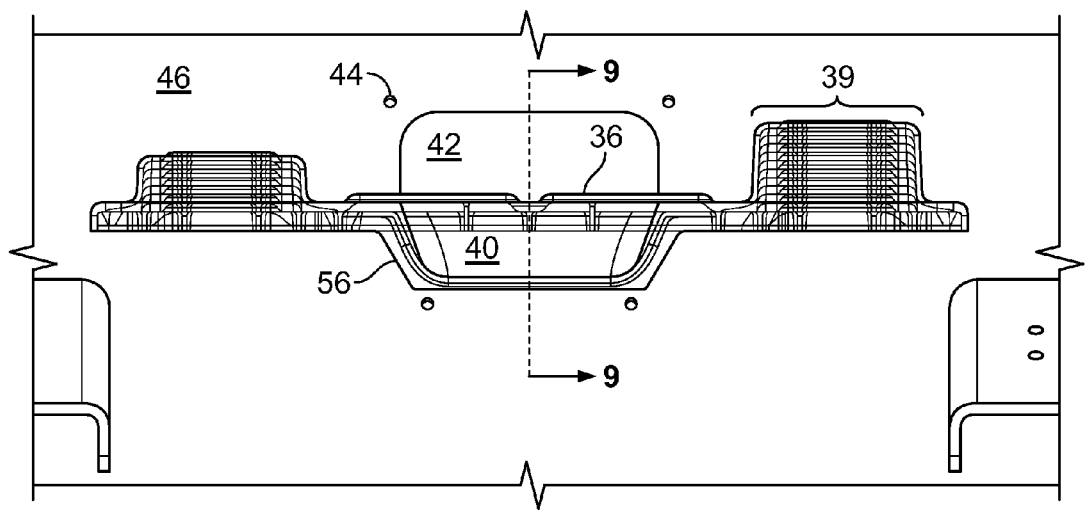
FIG. 8 is a view taken along line 8-8 of FIG. 2 of the present invention.
Figure 9:
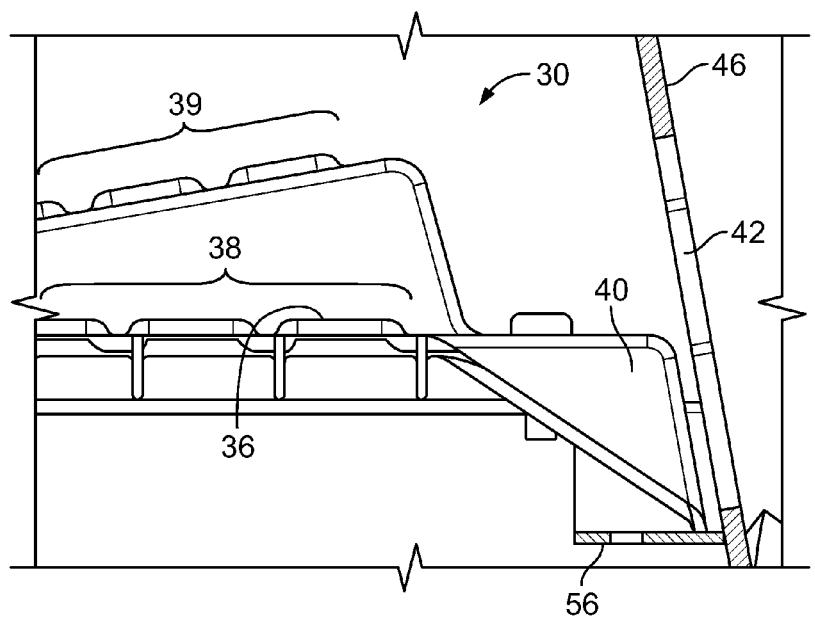
FIG. 9 is a cross section taken along line 9-9 from FIG. 8 of the present invention.

As shown in FIGS. 2, 6, 7, an alternate embodiment of the vehicle includes a pair of floor pedals 70 and pedal linkage 72 interconnecting the floor pedals 70. A layer 80 of material providing a cab floor includes a raised region 74 between pedals 70, similar to region 38 (FIG. 3). Raised region 74 includes features 76 which are similar to features 36 (FIG. 3) and a recessed groove 78 configured to receive pedal linkage 72. Layer 80 also includes recess 40 that is aligned with opening 42 formed in plate 46 to remove debris from the cab floor and exterior of the work vehicle as previously discussed.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A self-cleaning floor for use with a work vehicle comprising:
   a layer of material providing the floor for a cab of the work vehicle, the layer including features formed in a region to frictionally secure operator footing during operator egress/ingress and operation of the work vehicle;
   a recess formed along one end of the layer, wherein the one end extends in a direction substantially transverse to a primary direction of movement of the work vehicle, the recess includes a downwardly extending region and a transition surface extending from the layer to the downwardly extending region, and the downwardly extending region slopes downwardly along the primary direction of movement to the one end of the layer; and
   an opening formed in the work vehicle proximate to the recess and to the one end, wherein the opening is in substantial alignment with the recess to facilitate removal of debris from the cab floor and exterior of the work vehicle via the recess and the opening during operation of the work vehicle, and a first width of the opening in the direction substantially transverse to the primary direction of movement is greater than a second width of the downwardly extending region of the recess in the direction substantially transverse to the primary direction of movement;
   wherein change in speed and/or direction of the work vehicle urges debris on the cab floor toward the recess.

2. The floor of claim 1, wherein the layer of material is molded.

3. The floor of claim 1, wherein the layer has a unitary construction.

4. The floor of claim 1, wherein the transition surface includes a curved surface extending to the downwardly extending region.

5. The floor of claim 4, wherein the curved surface defines a convex surface facing an interior of the cab.

6. The floor of claim 1, wherein the work vehicle is a skid steer loader.

7. The floor of claim 6, wherein the primary direction of movement is substantially forward of a front end of the loader.

8. The floor of claim 1, wherein the layer is secured to base structure of the cab, forming a substantially fluid tight seal therebetween.

9. A work vehicle comprising:
   a motor secured to a frame for activating a driving device for selectably moving the frame;
   an operator cab supported by the frame;
   a self-cleaning floor for use with the work vehicle comprising:
   a layer of material providing the floor for the cab of the work vehicle, the layer including features formed in a region to frictionally secure operator footing during operator egress/ingress and operation of the work vehicle;
   a recess formed along one end of the layer, wherein the one end extends in a direction substantially transverse to a primary direction of movement of the work vehicle; and
   an opening formed in the work vehicle proximate to the recess and to the one end, wherein the opening is in substantial alignment with the recess to facilitate removal of debris from the cab floor and exterior of the work vehicle via the recess and the opening during operation of the work vehicle, and a first width of the opening in the direction substantially transverse to the primary direction of movement is substantially equal to a second width of the recess in the direction substantially transverse to the primary direction of movement;
   wherein change in speed and/or direction of the work vehicle urges debris on the cab floor toward the recess.

10. The work vehicle of claim 9, wherein the layer has a unitary construction.

11. The work vehicle of claim 9, wherein the recess includes a curved surface extending to a downwardly extending region of the recess.

12. The work vehicle of claim 11, wherein the curved surface defines a convex surface facing an interior of the cab.

13. The work vehicle of claim 9, wherein the work vehicle is a skid steer loader.

14. The work vehicle of claim 13, wherein the primary direction of movement is substantially forward of a front end of the loader.

15. The work vehicle of claim 9, wherein the layer is secured to base structure of the cab, forming a substantially fluid tight seal therebetween.

16. A work vehicle comprising:
   a motor secured to a frame for activating a driving device for selectably moving the frame;
   an operator cab supported by the frame;
   a self-cleaning floor for use with the work vehicle comprising:
   a layer of molded material providing the floor for the cab of the work vehicle, the layer including features formed in a region to frictionally secure operator footing during operator egress/ingress and operation of the work vehicle;
   a recess formed along one end of the layer, wherein the one end extends in a direction substantially transverse to a primary direction of movement of the work vehicle; and an opening formed in the work vehicle proximate to the recess and to the one end, wherein the opening is in substantial alignment with the recess to facilitate removal of debris from the cab floor and exterior of the work vehicle via the recess and the opening during operation of the work vehicle, and a first width of the opening in the direction substantially transverse to the primary direction of movement is substantially equal to a second width of the recess in the direction substantially transverse to the primary direction of movement;

wherein change in speed and/or direction of the work vehicle urges debris on the cab floor toward the recess.

17. The work vehicle of claim 16, wherein the layer has a unitary construction.

18. The work vehicle of claim 16, wherein the recess includes a curved surface extending to a downwardly extending region of the recess, and defining a convex surface facing an interior of the cab.

19. The work vehicle of claim 16, wherein the work vehicle is a skid steer loader.

20. The floor of claim 1, wherein the downwardly extending region is substantially flat.

* * * * *